Patented Mar. 5, 1935

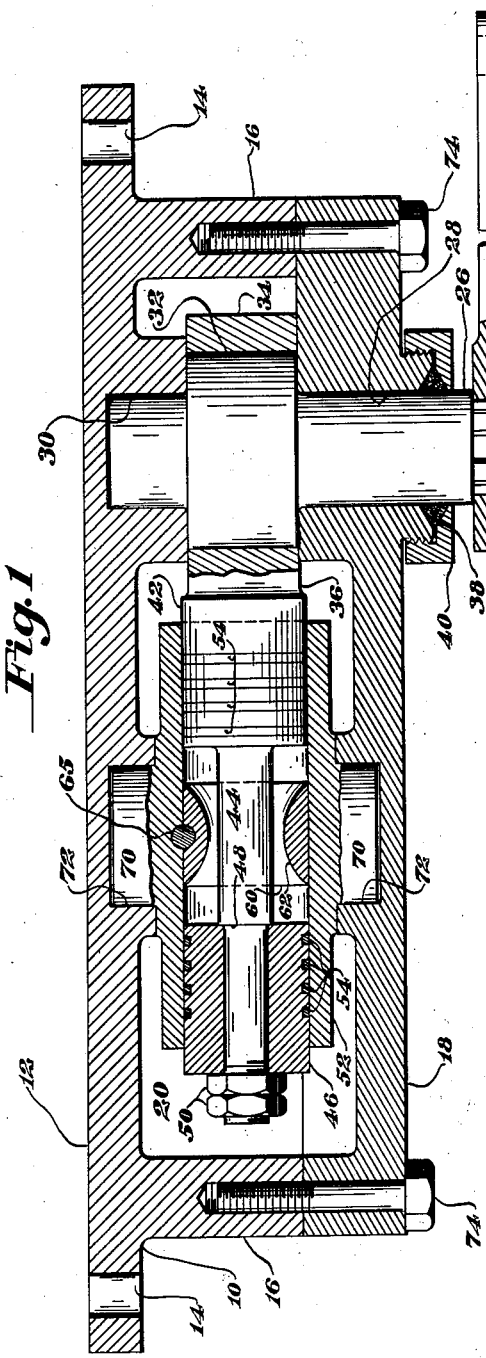

1,993,703

UNITED STATES PATENT OFFICE 1,993,703

SHOCK ABSORBER

Walter B. Clifford, Boston, Mass., assignor to Clifford Manufacturing Co., Boston, Mass., a corporation of Delaware Application August 29, 1931, Serial No. 560,203

8 Claims. (Cl. 188—88)

The present invention relates to shock absorbers for motor vehicles and other apparatus in which it is expedient or desirable to limit or confine the rebound of a spring by imposing resistance thereon.

The purpose of the present invention is to provide a simple, rugged and effective appliance of this character which, in its structural characteristics, lends itself admirably to production methods and which in its operation is independent of temperature conditions and capable of positively controlling and checking violent spring movements.

With this and other objects in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents a section in plan of my improved instrument; and Fig. 2 is a detail at right angles to Fig. 1, showing a section of a portion of the instrument.

Referring particularly to the illustrated embodiment of the invention, the instrument comprises a base portion 10, having an attaching surface 12 which is designed to be bolted or otherwise attached directly to the frame of a motor vehicle through bolt holes 14. The base may be of generally rectangular formation, and is provided with an outwardly projecting wall 16, which in conjunction with a head 18 provides a chamber 20 within which the working portions of the shock absorber are self-contained. As indicated the absorber may be provided with the usual arm 22 for attachment through a link to the movable portion of the apparatus such as the axle, this arm 22 being keyed to the outer end 24 of an oscillating shaft 26 which is journaled in bearings 28 and 30 formed respectively in the base 10 and head 18, as shown particularly in Fig. 1. The shaft 26 is provided with an eccentric portion 32, which may be surrounded by an eccentric sleeve or strap 34, forming a part of a reciprocating member 36. As will be evident, the purpose of this construction is to convert the oscillating motion of the arm 22 into a reciprocatory motion of predetermined extent of the member 36. The shaft 26 at the point where it emerges from the cap 18 may be stuffed, as at 38, with a gland 40.

The shock absorbing function of the instrument is accomplished by extruding a plastic or fluid medium through a restricted orifice, this medium preferably being of such a character that its condition is not measurably affected by variation in temperature of the instrument. I have found that amorphous graphite is well suited to my purpose, this material being capable of extrusion at a definite rate through a restricted orifice presenting the necessary resistance independently of temperature conditions.

I propose to impart resistance upon movement of the operating arm in either direction by providing two pistons spaced at opposite sides of a restricted orifice and encompassing a shock absorbing chamber which contains the graphite or equivalent shock absorbing material. To this end the member 36 is provided with an enlarged cylindrical portion 42 to form one piston, and extending therebeyond is a cylindrical portion 44 of substantially lesser diameter, upon the end of which is mounted a second piston 46 having the same diameter as the piston 42. The second piston is clamped against a shoulder 48 by clamping nuts 50. Both pistons are mounted for a sliding fit within an open-ended cylinder 52, the space between the pistons being sealed by rings 54. Positioned in the space encompassed by the pistons is a restricted orifice provided through an inset sleeve 60, having an inner convex surface 62 shaped to form an orifice of gradually restricted diameter somewhat on the fashion of a Venturi tube. This orifice, which may be indicated at 62, surrounds the stem 44 which moves axially thereof with the pistons. The amorphous graphite contained in the space surrounding the stem 44 and between the pistons is forced from one side to the other of the orifice upon movement of the pistons. By properly coordinating the effective size of the orifice and the shape of the convex surface 62, the instrument can be caused to present a light resistance to small movements, and an increasing resistance to movements of greater amplitude, which is a desirable characteristic in apparatus of this kind.

Reference to the drawing will indicate that the inset sleeve 60 is slipped within the cylinder and locked by a pin 65. The cylinder is preferably provided with integral trunnions 70, which are swivelled in bearings 72 formed respectively in the base 10 and head 18 to permit a slight oscillation of the shock absorbing assembly within the housing due to the motion of the eccentric 32. The chamber provided by the base 10 and head 18, and indicated generally at 20, is intercommunicating at opposite sides of the cylinder, this chamber being preferably filled with oil for lubrication purposes. In the normal operation of the instrument there is no intercommunication between the graphite-filled chamber and the outer surrounding oil chamber, due to the hermetic seal formed by the pistons and rings. The head is conveniently secured in the base by threaded members 74, and a gasket may be provided for sealing in the lubricating oil.

This construction provides a rugged, positively-operating assembly which resists violent motion, and is comparatively cheap and simple to manufacture, as the base, head and shock absorbing cylinder may be formed as forgings, and substantially all of the machine portions are either round holes or cylindrical surfaces. The fact that all the moving parts are sealed within the housing and subjected to the lubricating effect of oil within the chamber 20 eliminates substantial wear, and insures that the instrument shall operate effectively without servicing for long continued periods.

What is claimed is:

1. A shock absorber comprising a two-part housing, a cylinder oscillatably supported within the housing, opposed pistons sliding within the cylinder, operating connections for the pistons extending without the housing, a restricted orifice located between the pistons and graphitic material contained within the space between the pistons and designed to be forced through the orifice upon movement of the pistons in either direction.

2. A shock absorber comprising a cylinder having trunnions formed thereon, an inset sleeve having a generally convex inner surface connected to the cylinder, opposed pistons sliding within the cylinder at opposite sides of the sleeve, graphite contained within the space between the pistons, a two-part housing having a chamber in which the cylinder and pistons are received, bearings on the housing for supporting the trunnions, and operating connections for the pistons extending without the housing.

3. A shock absorber comprising a cylinder having trunnions formed thereon, an inset sleeve having a generally convex inner surface connected to the cylinder, opposed pistons sliding within the cylinder at opposite sides of the sleeve, graphite contained within the space between the pistons, a two-part housing having a chamber in which the cylinder and pistons are received, bearings on the housing for supporting the trunnions, a shaft oscillatably supported within the housing and extending without the housing, an arm connected to the outer end of the shaft, and connections between the shaft and piston for reciprocating the pistons upon oscillation of the shaft.

4. A shock absorber comprising a cylinder having trunnions formed thereon, an inset sleeve having a generally convex inner surface connected to the cylinder, opposed pistons sliding within the cylinder at opposite sides of the sleeve, graphite contained within the space between the pistons, a two-part housing having a chamber in which the cylinder and pistons are received, bearings on the housing for supporting the trunnions, a shaft oscillatably supported in the housing, an eccentric on the shaft, connections between the pistons and eccentric, and an arm connected to the shaft without the housing.

5. A shock absorber comprising a restricted orifice flaring outwardly at opposite ends, a chamber communicating with the orifice, amorphous graphite contained within the chamber, a piston for forcing the graphite through the restricted orifice upon movement thereof, and means connected with the piston for actuating the latter in accordance with vehicle spring movement.

6. A shock absorber comprising pistons encompassing a shock absorbing space, a restricted orifice dividing the space except for communication therethrough, amorphous graphite contained within the space and designed to be extruded through the orifice upon movement of the pistons in either direction, and means for operating the pistons together.

7. A shock absorber comprising a shock absorbing cylinder having a restricted orifice, amorphous graphite contained within the cylinder, a piston slidingly received within the cylinder and designed to force the graphite through the restricted orifice upon movement thereof, operating connections for actuating the piston in accordance with vehicle spring movement, and a housing enclosing the shock absorbing cylinder and pistons and having a lubricating chamber within which the moving parts are received.

8. A shock absorber comprising a shock absorbing cylinder having a restricted orifice, amorphous graphite contained within the cylinder, a piston slidingly received within the cylinder and designed to force the graphite through the restricted orifice upon movement thereof, operating connections for actuating the piston in accordance with vehicle spring movement, a housing, connections between the cylinder and housing permitting rocking movements of the cylinder therein, and operating connections extending without the housing for moving the piston in timed relation to spring action.

WALTER B. CLIFFORD.